United States Patent
Jou

Patent Number: 5,609,436
Date of Patent: Mar. 11, 1997

[54] COUPLING STRUCTURE

[76] Inventor: Yuh-Chiou Jou, No. 49, Linyun Street, Ban Chyau City, Taipei Hsien, Taiwan

[21] Appl. No.: 568,420

[22] Filed: Dec. 6, 1995

[51] Int. Cl.⁶ ........................................ E04H 15/34
[52] U.S. Cl. ........................... 403/400; 403/398; 403/389; 403/DIG. 9
[58] Field of Search ..................... 403/234, 233, 403/243, 256, 400, 398, 399, 389, DIG. 9

[56] References Cited

U.S. PATENT DOCUMENTS

| | | | |
|---|---|---|---|
| 2,584,614 | 2/1952 | Rasmussen et al. | 403/400 X |
| 5,167,466 | 12/1992 | Hsieh | 403/400 X |
| 5,498,264 | 3/1996 | Schapfer et al. | 403/400 X |

FOREIGN PATENT DOCUMENTS

| | | | |
|---|---|---|---|
| 803268 | 9/1936 | France | 403/400 |
| 684190 | 3/1965 | Italy | 403/400 |

*Primary Examiner*—Anthony Knight
*Attorney, Agent, or Firm*—Beveridge, DeGrandi, Weilacher & Young

[57] ABSTRACT

A coupling structure includes two couplings joined back-to-back as a unit by means of a bolt, each coupling consisting of a box-like base, a pair of non-skid blocks disposed within the base, a cover pivotally connected to the base, a press plate and a couple of adjusting screw bolts. The base is provided with notches in its two longitudinal walls for supporting a tube. The non-skid blocks are respectively provided with upper non-skid surfaces for urging against a lower portion of the tube. After the tube is mounted within the base, the cover is locked in place by means of the screw bolts which join the press plate to the cover and pass through corresponding holes in the base and the non-skid blocks to secure the tube.

1 Claim, 3 Drawing Sheets

COUPLING STRUCTURE

BACKGROUND OF THE INVENTION (a) Field of the Invention

The present invention relates generally to a coupling structure, and more particularly to a coupling structure which allows insertion therein a tube from one side thereof to be secured therein and permits two adjacent couplings to be positioned at whatever angles.

(b) Description of the Prior Art

Couplings are used to join tubes or pipes at various points and angles so as to form planar or dimensional frameworks for use in tents, for instance. A conventional coupling is shown in FIG. 4. It essentially consists of a sleeve 11 for receiving a circular inner tube 2, and another sleeve 12 welded to the sleeve 11 at a desired angle for receiving another circular tube 2. A screw hole 1" is formed in one side of the sleeves 11, 12 for receiving a bolt 1A such that the bolt 1A may press against one side of the inner tube to position it. However, there are various drawbacks in using such conventional couplings.

1. As the inner tube 2 has to be pushed into the sleeve 11 or 12 from the upper end or the lower end thereof, if the inner tube 2 is long, the operation is quite troublesome and time-consumptive. In particular, if the inner tube 2 is long and slightly curved, it will be difficult to push the inner tube 2 into the sleeve 11 or 12. Likewise, it will be as difficult to remove the inner tube 2 from the sleeve 11 or 12. When erecting a large temporary framework or support which has to be dismantled after use, it will require many skilled workers in order to erect or dismantle the framework within a short time, which is very impractical indeed.
2. After a framework is erected by means of the prior couplings, if it is necessary to install additional tubes at a middle section thereof, since the inner tubes 2 must fit into the sleeves 11 and 12, the entire framework has to be taken apart, which is very time-and labor-consumptive, and uneconomical as well.
3. Since the sleeves 11 and 12 are joined by welding, their angular position cannot be adjusted. If it is required to connect tubes at various angles, a number of couplings 1 of various angles have to be used, so that couplings of various specifications may have to be selected. Besides, there are limited specifications of couplings to allow adjustment of angular connection of the tubes.
4. Since the inner tube 2 is positioned in the sleeve 11 or 12 by means of the bolt 1A which urges against one side of the inner tube 2 from one side of the sleeve 11 or 12, if the inner tube 2 is large or the bolt 1A is not locked tightly, the inner tube 2 may slip out. As a consequence, the framework may easily slant to one side or collapse.

SUMMARY OF THE INVENTION

Accordingly, a primary object of the present invention is to provide a coupling structure which may be opened from one side thereof for receiving a middle section of a tube so as to eliminate the drawback in the prior art in which the tube is required to fit into the coupling from one end thereof.

Another object of the present invention is to provide a coupling structure in which the connecting angle between two couplings may be adjusted before locking in position to allow free adjustment of the positions of tubes so as to eliminate the need for various specifications of couplings, hence reducing costs.

A further object of the present invention is to provide a coupling structure consisting of a base accommodating therein non-skid blocks which are provided with upper non-skid surfaces for urging against a tube disposed thereon, and having a removable cover pivotally connected thereto, which has a bottom side pressing against the tube when the cover is properly positioned on a base.

Still another object of the present invention is to provide a coupling structure with a removable cover to allow insertion of a tube from one side of the coupling or removal of the tube therefrom so that tubes may be added to or removed from a completed framework with convenience, eliminating the drawback in the prior art.

Still a further object of the present invention is to provide a coupling structure with non-skid blocks the relative position of which may be adjusted by means of bolts to adapt to tubes of various specifications.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
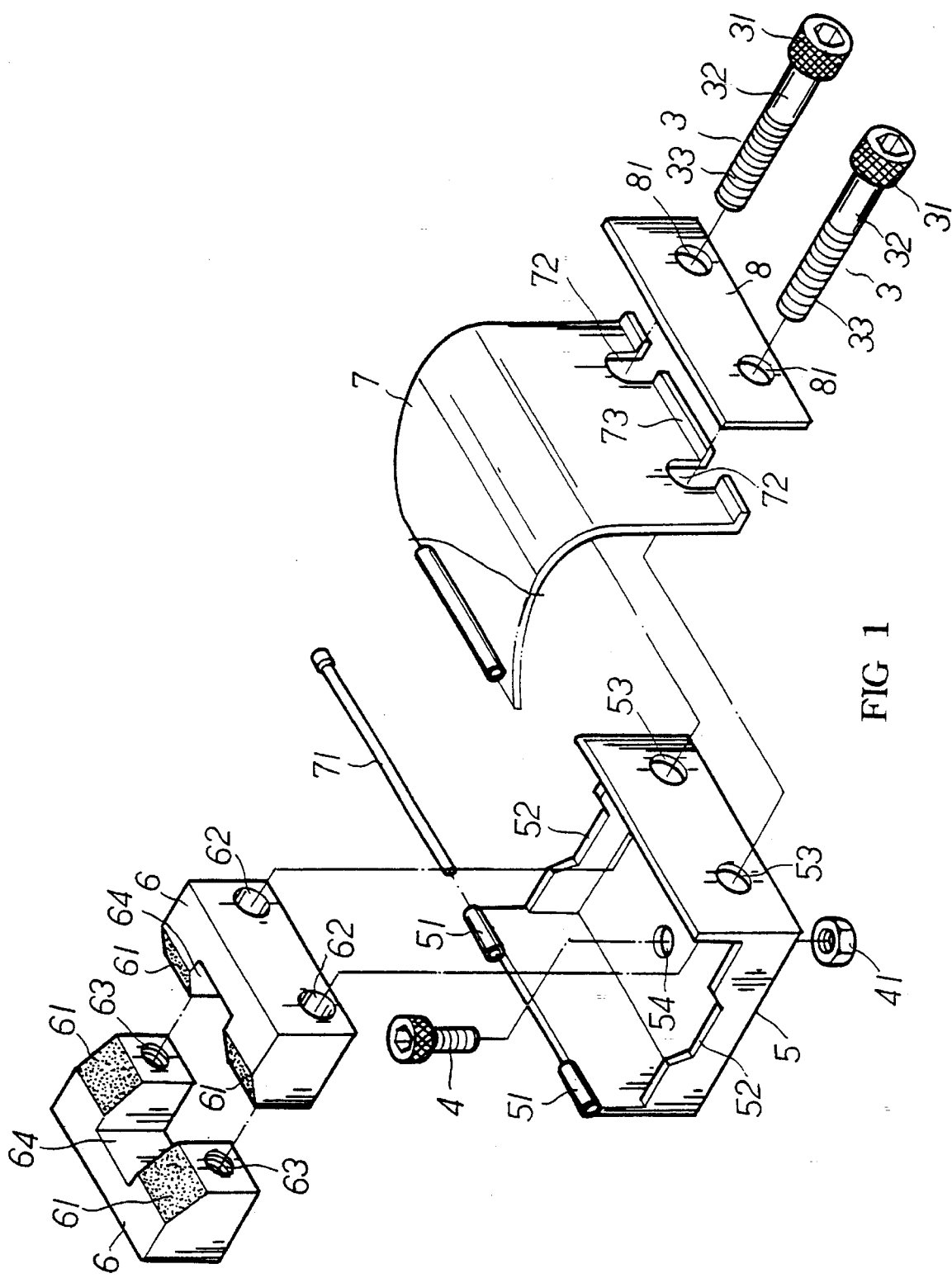
FIG. 1 is a perspective exploded view of the present invention.
Figure 2:
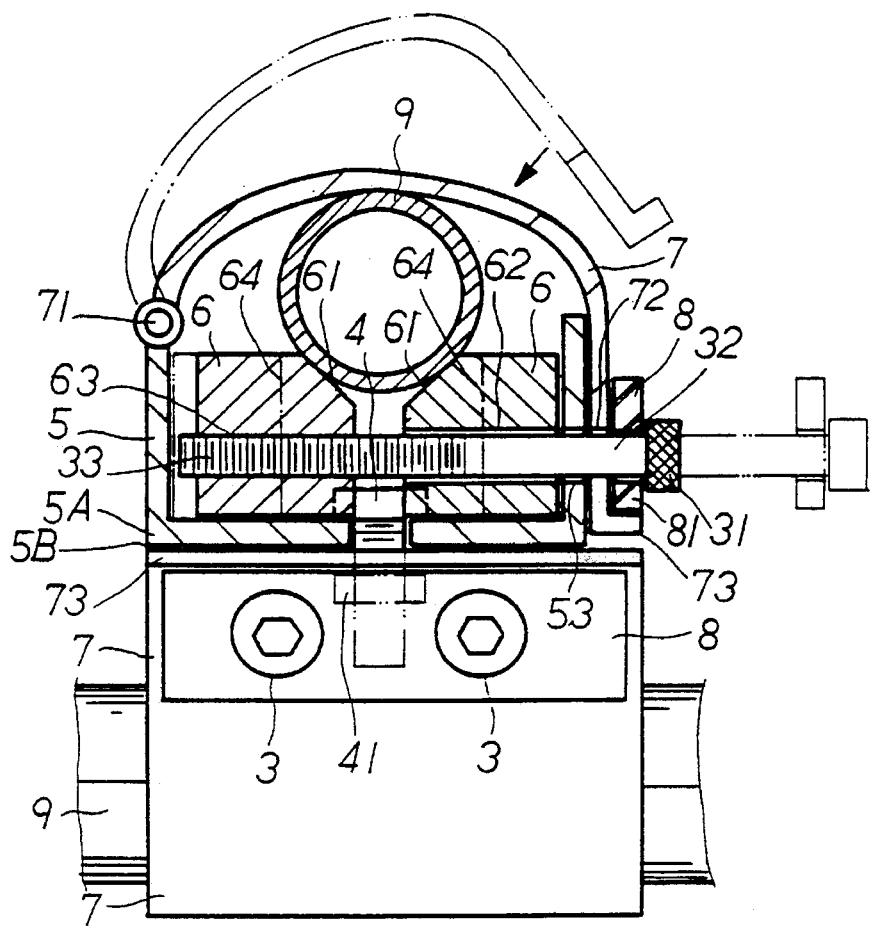
FIG. 2 is a schematic sectional view of the invention in an assembled and locked state.
Figure 3:
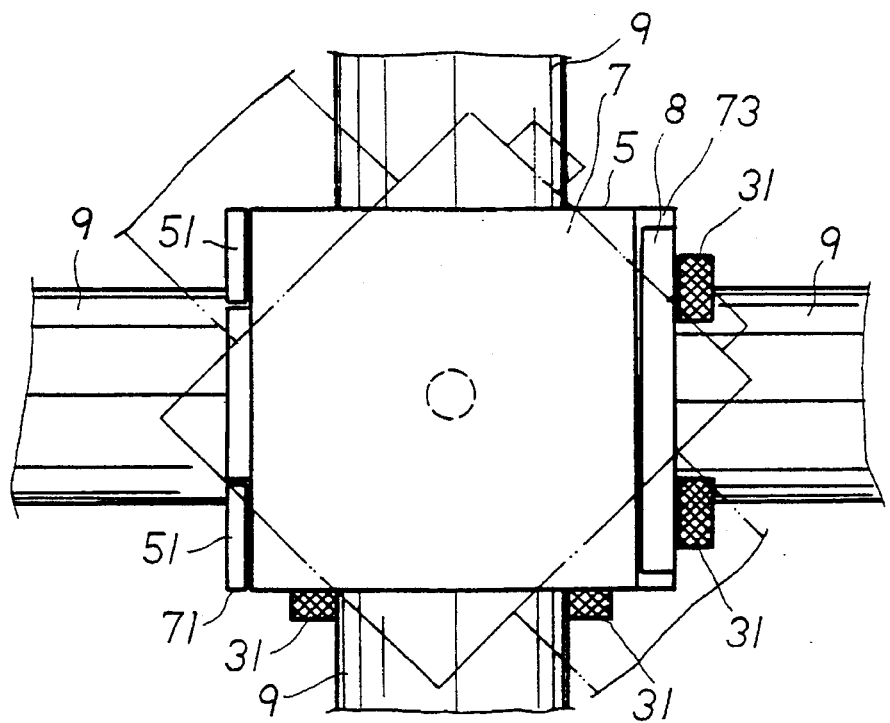
FIG. 3 is a schematic sectional view of the invention in an assembled state, illustrating adjustment of the couplings arranged back-to-back.
Figure 4:
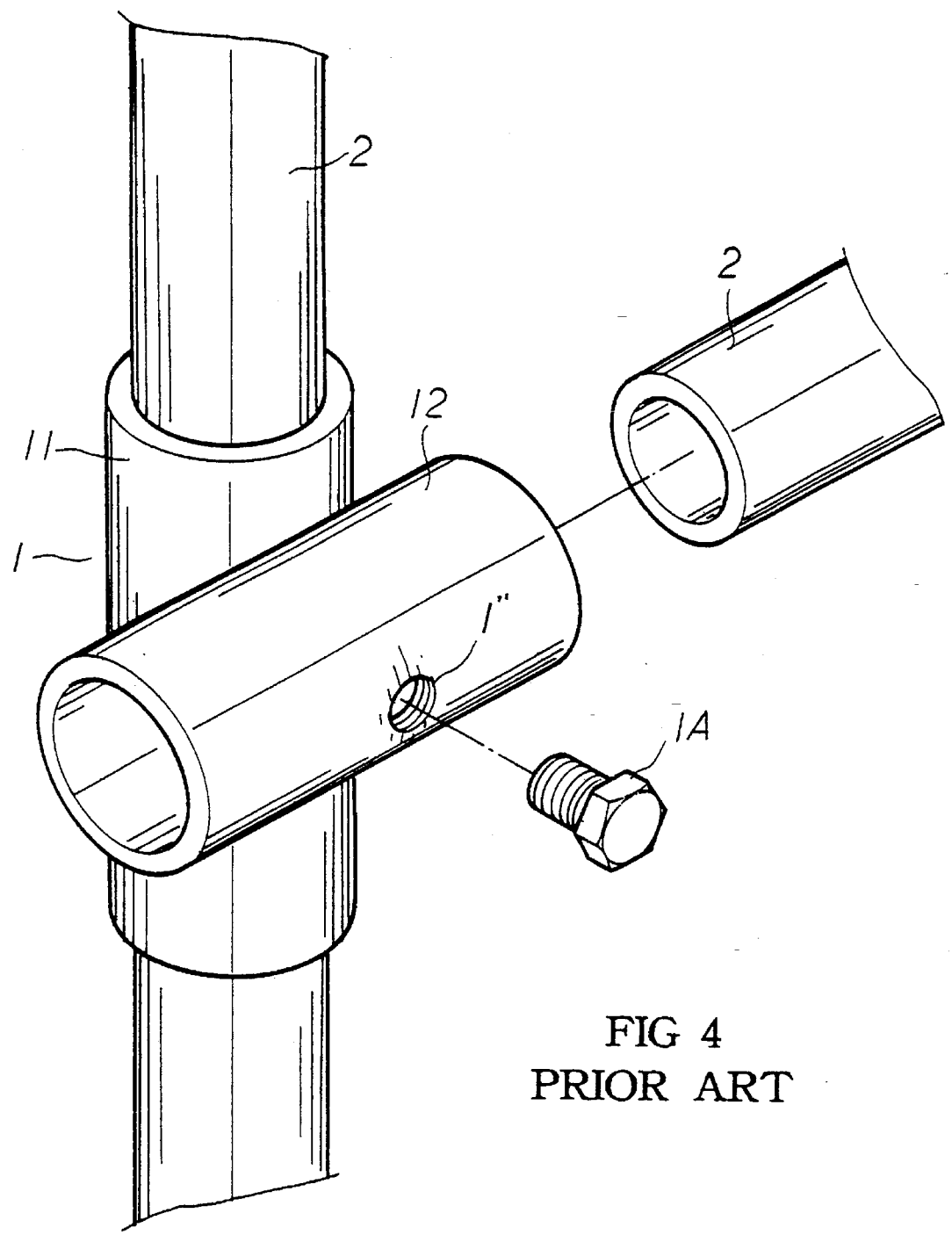
FIG. 4 is a perspective view of a prior coupling.

With reference to FIGS. 1, 2 and 3, the present invention essentially comprises two couplings arranged back to back with a bolt 4 pivotally joining and positioning the couplings. Each coupling consists of a box-like base 5, a pair of non-skid blocks 6, a movable cover 7, a press plate 8 and screw bolts 3.

The box-like base 5 have four side walls, and two hollow rods 51 are arranged at either end of the upper surface of a rear lateral side wall thereof. The longitudinal side walls of the base 5 are respectively provided with a substantially U-shaped notch 52 in an upper surface thereof for supporting a tube 9. Two bolt holes 53 are formed in a front lateral side wall of the base 5 at the left and the right sides. A bottom hole 54 is also formed in a central portion of a bottom side of the base 5.

Each non-skid block 6 is a substantially U-shaped structure with a concavity 64 formed in a middle portion thereof and two arms. The top surfaces of the two arms are configured to be slanting and are provided with non-skid surfaces 61. The non-skid blocks 6 are arranged on the bottom side of the base 5 with their notches 64 face-to-face, such that the first of the non-skid blocks 6 lies against the front lateral side wall of the base 5 and has two through holes 62 aligning with the bolt holes 53. The second of the non-skid blocks 6 lies against the rear lateral side wall of the base 5 and is also provided with two screw holes 63 in its two arms facing the two through holes 62 of the other non-skid block 6. The inner diameter of the screw hole 63 is slightly smaller than that of the through hole 62. When two bases 5 are arranged back to back, the space defined between the notches 64 of the non-skid blocks 6 allows insertion of a tool to drive a bolt 4 through the bottom hole 54 of the base 5 into the bottom hole 54 of the other base 5 to be locked with a nut 41. Prior to locking the nut 41 onto the bolt 4, the relative positions of the bases 5 respectively supporting tubes 9 may be adjusted, as shown in FIG. 3, hence achieving the object of easy assembly. Particularly, since tubes are generally assembled into planar or dimensional frameworks and since they are formed of a series rectangular frames of at least four tubes, the stability of the assembly of the rectangular frame mainly comes from the interaction of the four tubes (the so-called four-bar action) so that the locking strength required of the bolt 4 becomes undermined and the bolt 4 becomes merely an auxiliary positioning member.

The movable cover 7 is a substantially curved structure with a straight section for covering the front lateral side wall of the base 5. The cover 7 has a hollow rod provided at an upper rim thereof such that, when the cover 7 is placed on the base 5, a post 71 may pass through one of the hollow rods 51 of the base through the hollow rod of the cover 7 into the other of the hollow rods 51 of the base 5, thus pivotally connecting the cover 7 to the base 5. By this arrangement, the tube 9 may be held between the notches 52 of the base 5 and the bottom side of the cover 7. The straight section of the cover 7 is configured to have two inverted-U shaped notches 72 formed at a lower portion thereof and a lip 73, the upper ends of the notches 72 flushing against the upper ends of the bolt holes 53 of the base 5 when the cover 7 is positioned on the base 5.

The press plate 8 is a rectangular plate structure and is provided with a bolt hole 81 each at the left and right sides for matching the bolt holes 53 of the base 5. The press plate 8 has a thickness equivalent to the width of the lip 73 of the cover 7 so that it may be placed on the lip 73 with the bolt holes 81 aligning with the notches 72.

The adjusting screw bolts 3 each have an enlarged cap section 31 which may be clamped by a hand tool during turning. Adjacent to the cap section 31 is a middle section 32 which is joined to a threaded section 33. Before the tube 9 and the cover 7 are positioned, the screw bolts 3 are respectively inserted via the bolt holes 81 of the press plate 8 into the bolt holes 53 of the base 5 and the through holes 62 of the first nonskid block 6 into the screw holes 63 of the second nonskid block 6 with the threaded section 33 engaging the threads of the screw holes 63, so that the non-skid blocks 6 may be secured on the base 5. After the tube 9 is placed inside the base 5, the cover 7 is positioned in place such that its notches 72 pass through the middle sections 32 of the screw bolts 3 (as shown by imaginary lines in FIG. 2) so that, by driving the screw bolts 3 inwardly, the press plate 8 on the lip 73 will be caused to press against the cover 7 to prevent the cover 7 from slipping out. The cap sections 31 of the screw bolts 3 are located on the outside of the press plate 8 to facilitate turning and adjustment (as shown in FIG. 2). Besides, since the screw bolts 3 are pressed against the press plate 8 and since the tube 9 is positioned within the base B between the non-skid blocks 6, the first non-skid block 6 is forced to lie closer against that side of the front lateral side wall of the base 5 and is therefore positioned. In addition, since the threaded section 33 of the screw bolt 3 are locked in the screw holes 63 of the second non-skid block 6 whose horizontal displacement is restricted by the longitudinal side walls of the base 5, the second non-skid block 6 may be forced to draw near the first non-skid block 6 (as shown by solid lines in FIG. 2). Hence, the non-skid surfaces 61 of the two non-skid blocks 6 will urge against the tube 9 located thereupon. Aided by the force exerted by the bottom side of the cover 7, the tube 9 will be firmly positioned within the base 5 when the cover 7 is properly positioned.

In order to remove the coupling of the invention from the tube 9, it is only necessary to repeat the above procedures in a reverse manner. After the screw bolts 3 are turned loose, as the second non-skid block 6 is caused to withdraw, the urging action imposed thereby on the tube 9 is released, and as the press plate 8 is removed from the lip 73 of the cover 7 with the removal of the screw bolts 3, the cover 7 may be lifted and the coupling according to the present invention may be removed from the tube 9 in a convenient and speedy way. In particular, since the cover 7 may be lifted, tubes 9 may be added or removed from the couplings of the invention is made easier and more convenient as compared to the prior art.

With reference to FIG. 3, when two bases 5 are arranged back-to-back, aside from using the bolt 4 and the nut 41 to fasten them together, the bottom sides of the bases 5 may be configured to have non-skid surfaces to provide a checking action. Optionally, bosses 5A and corresponding depressions 5B may be formed on the respective bottom sides of the bases 5 so that the bottom sides of the bases 5 may be firmly positioned and so that they will not easily move after their relative position are properly adjusted and they are locked. Such an arrangement is common in the art and will be not described in detail herein.

Although the present invention has been illustrated and described with reference to the preferred embodiment thereof, it should be understood that it is in no way limited to the details of such embodiment but is capable of numerous modifications within the scope of the appended claims.

What is claimed is:

1. A coupling structure consisting of two couplings joined back-to-back as a unit by means of a bolt, said couplings comprising:

a box-like base having four side walls, two hollow rods being disposed on either side of an upper surface of a rear lateral side wall thereof, two notches being individually formed in middle sections of two longitudinal side walls thereof for supporting a tube, and two bolt holes being formed on either side of a front lateral side wall thereof, said base further having a bottom side provided with a bottom hole in a central portion thereof;

a pair of non-skid blocks arranged face-to-face in a longitudinal manner and placed inside said base with a first non-skid block lying against said front lateral side wall of said base and a second non-skid block lying against said rear lateral side wall of said base such that lateral displacement of said non-skid blocks being restricted by said longitudinal side walls of said base, each of said non-skid blocks having a substantially U-shaped notch in a middle section thereof and slanting arms the upper surfaces thereof being provided with non-skid surfaces, said first non-skid block having a couple of through holes matching said bolt holes of said front lateral side wall of said base, while said second non-skid block having a couple of screw holes aligning with said through holes of said first non-skid block, said screw holes having an internal diameter slightly smaller than that of said through holes, a space defined between said notches of said non-skid blocks allowing insertion of a hand tool to drive a bolt through said bottom hole in said base into a bottom hole of an adjacent base to be locked with a nut;

a cover pivotally connected to said base and having a curved section and a straight section, a rim of said curved section being provided with a hollow rod for passage of a post which joins said cover pivotally to said hollow rods of said rear lateral side wall of said base so that said cover may be lifted up to allow insertion or removal of the tube into or from said base, the tube being firmly held between a bottom side of said cover and said non-skid surfaces of said non-skid blocks, said rear section of said cover having two inverted-U shaped notches disposed at the left and right sides thereof and a lip formed at a rim thereof, said notches having upper portions thereof aligning with said bolt holes of said front lateral side wall of said base when said cover is positioned and locked in place;

a press plate having a thickness equivalent to a width of said lip, said press plate being provided with a couple of bolt holes in the left and right sides thereof for matching said bolts holes of said front lateral side wall of said base and aligning with said notches of said cover; and a pair of adjusting screw bolts each of which is provided with an enlarged cap section to be clamped by a hand tool during turning, a middle section and a rear threaded section, said bolts being passed through said bolt holes of said press plate and said notches of said cover into said bolt holes of said front lateral side wall of said base and said through holes of said first non-skid block to be locked within said screw holes of said second non-skid block for securing said non-skid blocks within said base before said cover is positioned in place, said cover being positioned in place with said notches thereof fitting onto said middle sections of said screw bolts after the tube is mounted on said notches of said longitudinal side walls of said base, said screw bolts being turned tightly so that said press plate is located on said lip of said cover to press against said straight section of said cover so as to keep said cover firmly in place, said second non-skid block being forced to draw near said first non-skid block by turning of said screw bolts so that said non-skid blocks may urge against a lower portion of the tube above while the bottom side of said cover exerts a force downwardly upon an upper portion of the tube.

\* \* \* \* \*